(12) United States Patent
Liu

(10) Patent No.: US 9,325,521 B2
(45) Date of Patent: Apr. 26, 2016

(54) MEDIA SHARING DEVICE

(75) Inventor: Pei Chung Liu, New Taipei (TW)

(73) Assignee: MAGIC CONTROL TECHNOLOGY CORP., New Taipei (TW)

( * ) Notice: Subject to any disclaimer, the term of this patent is extended or adjusted under 35 U.S.C. 154(b) by 430 days.

(21) Appl. No.: 13/286,321

(22) Filed: Nov. 1, 2011

(65) Prior Publication Data

US 2013/0046907 A1    Feb. 21, 2013

(30) Foreign Application Priority Data

Aug. 17, 2011    (TW) .............................. 100129355 A

(51) Int. Cl.
| | |
|---|---|
| G06F 13/12 | (2006.01) |
| H04L 12/46 | (2006.01) |
| G06F 3/02 | (2006.01) |
| H04N 21/4143 | (2011.01) |
| H04N 21/4363 | (2011.01) |

(52) U.S. Cl.
CPC .......... *H04L 12/4625* (2013.01); *G06F 3/0227* (2013.01); *G09G 2370/10* (2013.01); *H04N 21/4143* (2013.01); *H04N 21/43632* (2013.01)

(58) Field of Classification Search
None
See application file for complete search history.

(56) References Cited

U.S. PATENT DOCUMENTS

| | | | |
|---|---|---|---|
| 6,802,010 B1* | 10/2004 | Kim et al. ........................ | 726/20 |
| 7,631,337 B2* | 12/2009 | King et al. ..................... | 725/141 |
| 8,001,173 B2* | 8/2011 | Matsunaga et al. ............ | 709/200 |
| 2003/0236933 A1* | 12/2003 | Shigeta ............... | G06F 11/1464 710/72 |
| 2007/0050499 A1* | 3/2007 | Atherton et al. ............... | 709/224 |
| 2007/0250623 A1* | 10/2007 | Hickey et al. ................... | 709/224 |
| 2008/0127182 A1* | 5/2008 | Newport et al. .................... | 718/1 |
| 2008/0168188 A1* | 7/2008 | Yue et al. .......................... | 710/15 |
| 2008/0320500 A1* | 12/2008 | Li et al. .......................... | 719/324 |
| 2009/0024847 A1* | 1/2009 | Sun ................................. | 713/165 |
| 2010/0180055 A1* | 7/2010 | Lyon et al. ....................... | 710/62 |
| 2010/0303475 A1* | 12/2010 | Kang ..................... | G09G 5/006 398/212 |
| 2011/0063211 A1* | 3/2011 | Hoerl et al. .................... | 345/157 |
| 2011/0258622 A1* | 10/2011 | Burckart et al. .................. | 718/1 |

FOREIGN PATENT DOCUMENTS

| | | |
|---|---|---|
| TW | 201017420 A | 5/2010 |
| TW | 201032051 A | 9/2010 |

OTHER PUBLICATIONS

Taiwanese Office Action & Search Report dated Mar. 12, 2014, for TW 100129355, and English translation thereof.

\* cited by examiner

*Primary Examiner* — Henry Tsai
*Assistant Examiner* — John Roche
(74) *Attorney, Agent, or Firm* — Bacon & Thomas, PLLC

(57) ABSTRACT

A media sharing device includes a data bridge device and two switching control modules. The data bridge device has two terminals connected to USB interface ports of two computers and provides bi-directional transmission of media of displayed image, keyboard, cursor, and sound of the computers in USB data format between the computers. Switching control modules are mounted in the computers and are activated by an associated activation device to switch the controlling side and controlled side of the computers. The controlling side computer transmits data of displayed image, keyboard, cursor, and sound to the controlled side computer for computer display, executing the displayed image, keyboard, cursor, and sound supplied from the controlling side computer, or the activation device of the controlled side computer is activated to issue an instruction to the controlling side computer to switch the controlling side and the controlled side of the computers.

5 Claims, 8 Drawing Sheets

MEDIA SHARING DEVICE

BACKGROUND OF THE INVENTION

1. Field of the Invention

The present invention relates to a media sharing device, and in particular to a device that is applicable to sharing media, such as image, keyboard, cursor, and sound, between at least two computers and comprises an activation device for activating switching of positions between a controlling side computer and a controlled side computer.

2. The Related Arts

A conventional connection architecture between computers only functions for transmission of data. A bulky, complicated and expensive servo network must be adopted for transmitting and sharing media, such as image, keyboard, cursor, and sound, from one computer to another computer. This requires a high system cost and complicated construction of network. Further, interactive operation of media, such as image, keyboard, cursor, and sound, between the computers may only be executed through the servo. This makes the interactive operation very difficult and may only be realized through additionally adopted servo resources without fully using and sharing the existing hardware resources of the computers. This is apparently economically inefficient.

Prior art references are known. For example, Taiwan Patent No. 13336264 discloses a traditional image frame interaction system that is operated with servo based architecture, and apparently shares the same drawbacks of the above discussed conventional computers that require an expensive servo system and a complicated network structure to realize simultaneously displaying the same image with multiple computers.

Further, Taiwan Patent No. 1340320 discloses an interactive multimedia system that is based on a servo system. Although multiple uses may simultaneously share the same image of the display screens, yet it requires a great number of servo machines and complicated network architecture. Apparently, this Taiwan patent shares the same drawbacks as that described above for simultaneously displaying same image on multiple computers.

In addition, Taiwan Patent No. 1229808 and U.S. Pat. No. 7,203,788 disclose a USB-to-VGA converter, which teaches the technique of uni-directionally transmit and display an image between at least two computers.

SUMMARY OF THE INVENTION

The conventional way of connection between computers for transmission of displayed image, keyboard, cursor, and sound requires expensive servo devices and complicated network structure so as to result in high system cost and complicated engineering of network construction.

Thus, an objective of the present invention is to provide a media sharing device, which comprises at least one data bridge device and two switching control modules. The data bridge device has two terminals respectively connected to USB interface ports of two computers having display devices. The data bridge device provides bi-directional transmission of media of displayed image, keyboard, cursor, and sound of the computers in USB data format between the computers. The switching control modules are respectively mounted in the computers. The switching control module is activated by an associated activation device to switch the controlling side and controlled side of the computers. The controlling side computer is allowed to transmit the data of displayed image, keyboard, cursor, and sound to the controlled side computer to have the controlled side computer display, execute the displayed image, keyboard, cursor, and sound supplied from the controlling side computer, or the activation device of the controlled side computer is activated to issue an instruction to the controlling side computer to switch the controlling side and the controlled side of the computers.

The effectiveness of the media sharing device according to the present invention is that a data bridge device that has a low cost and simple structure and has commonly-used USB interface is provided for connecting between at least two computers and USB data format is adopted to perform bi-directional transmission of media data of displayed image, keyboard, cursor, and sound between the computers. Further, switching control modules are directly mounted in the computers to allow the computers to do bi-directional transmission and sharing of the media data of displayed image, keyboard, cursor, and sound. The most importantly inventive idea is that the hardware resources of the computers are allowed to share execution, playing, and processing of the media data of displayed image, keyboard, cursor, and sound so that the computer resources can be effectively saved. Further, the drawbacks of the conventional computers that cannot transmit, share, display, and execute the media data without installation of a servo system. Further, the present invention provides an activation device that can be easily operated to activate switching between the controlling side and the controlled side of the computers so as to realize a substantial improvement of economic efficacy of the industry.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
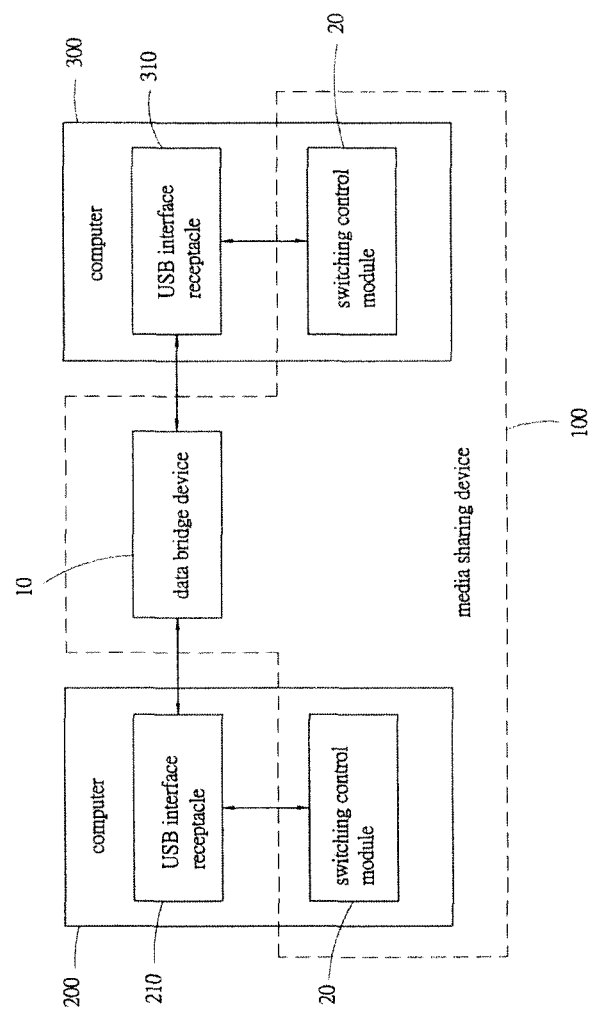
FIG. 1 is a circuit block diagram illustrating a media sharing device according to a first embodiment of the present invention.
Figure 2:
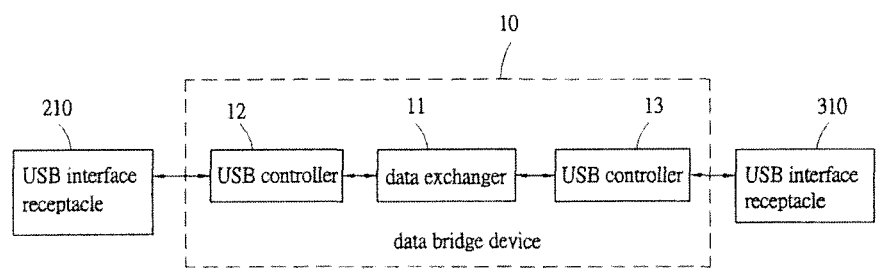
FIG. 2 is a circuit block diagram illustrating a data bridge device according to the present invention.

With reference to the drawings and in particular to FIGS. 1 and 2, a media sharing device constructed in accordance with a first embodiment of the present invention is generally designated at 100. The media sharing device 100 comprise at least one data bridge device 10, which is not limited to any specific configuration. In accordance with the present invention, the data bridge device 10 comprises at least one data exchanger 11 and at least one pair of USB controllers 12, 13. The data exchanger 11 provides a function of converting media data, such as displayed image, keyboard, cursor, and sound, into USB data format. The USB controllers 12, 13 are respectively connected to two terminals of the data exchanger 11. The USB controller 12, 13 are also respectively connected to a USB interface receptacle 210 of a computer 200 and a USB interface receptacle 310 of another computer 300, so that the computers 200, 300 may carry out bi-directional transmission of data of displayed image, keyboard, cursor, and sound with USB data format.

Figure 3:
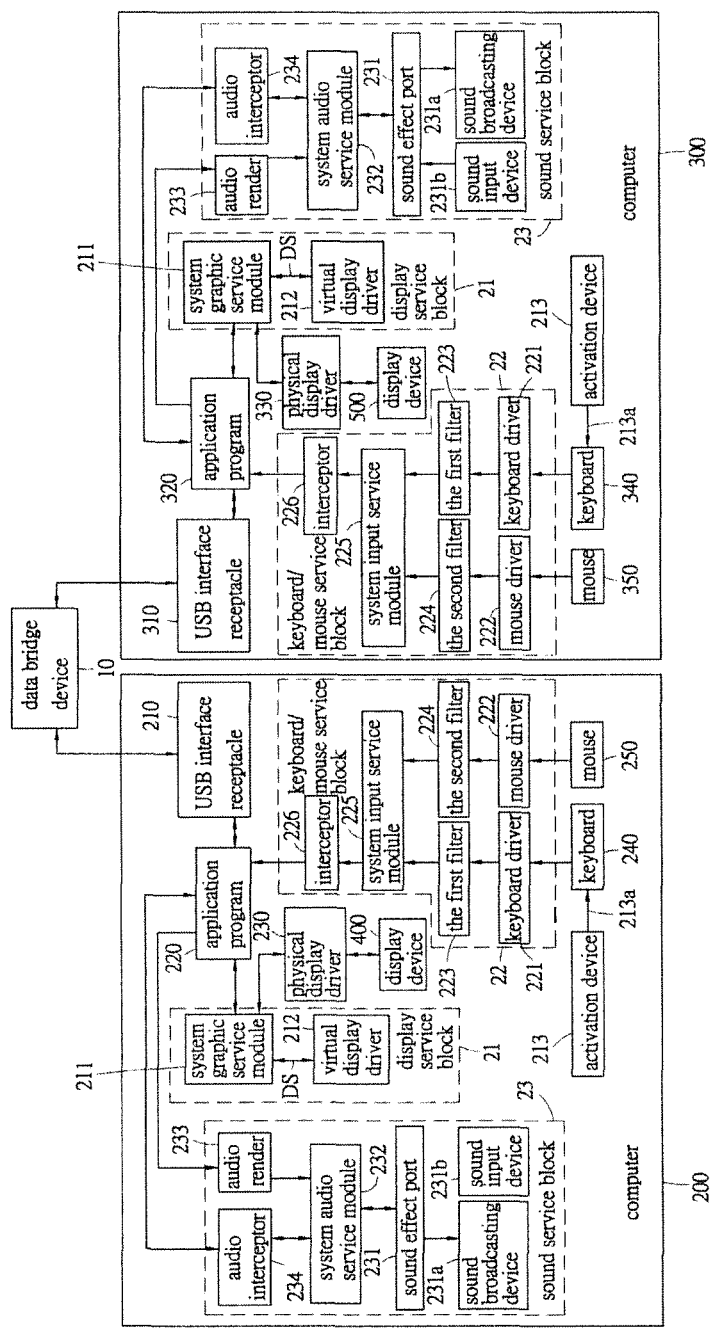
FIG. 3 is a circuit block diagram illustrating a switching control module according to the present invention.

Also referring to FIG. 3, at least one pair of switching control modules 20 respectively built in the computers 200, 300. Each switching control module 20 comprises at least one display service block 21, a keyboard/mouse service block 22, a sound service block 23, and an activation device 213. The display service block 21 comprises at least one system graphic service module 211 and at least one virtual display driver 212. The system graphic service modules 211 are respectively connected to an application program 220 of the computer 200 and an application program 320 of the computer 300 to receive data of displayed image of USB data format that are supplied from the USB controllers 12, 13 of the data bridge device 10 in order to take procession of displayed image data of USB data format to issue a displayed image signal DS to a physical display driver 230 of the computer 200 and a physical display driver 330 of the computer 300, whereby the physical display driver 230, 330 respectively transmit image displaying signals to the display devices 400, 500 to be displayed.

Each virtual display driver 212 is connected to the respective system graphic service module 211 to receive the displayed image data of USB data format from the system graphic service module 211 and convert the displayed image data into the displayed image signal DS to be transmitted back to the system graphic service module 211.

Each keyboard/mouse service block 22 comprises at least a keyboard driver 221, a mouse driver 222, a first filter 223, a second filter 224, a system input service module 225, and an interceptor 226. The keyboard drivers 221 are respectively connected to a keyboard 240 of the computer 200 and a keyboard 340 of the computer 300 to receive keyboard input signals from the keyboards 240, 340. The mouse drivers 222 are respectively connected to a mouse 250 of the computer 200 and a mouse 350 of the computer 300 to receive mouse input signals from the mice 250, 350. The first filters 223 are respectively connected to the keyboard drivers 221 to take a filtering operation on the keyboard input signals. The second filters 224 are respectively connected to the mouse drivers 222 to take a filtering operation on the mouse input signals. The system input service modules 225 are respectively connected the first and second filters 223, 224 to received the filtered keyboard input signal and the filtered mouse input signal, which are processed by the system input service modules 225 to supply control instructions and cursor data of keyboards and mice. The interceptors 226 are respectively connected to the system input service modules 225 to intercept the outputs of control instructions and cursor data of keyboards and mice. The interceptors 226 are also respectively connected to the application program 220 of the computer 200 and the application program 320 of the computer 300 to intercept sharing data of input through keyboards or cursors that are transmitted through the USB interface receptacles 210, 310 or input data of keyboards or cursors of the systems of the computers 200, 300 to allow the system input service modules 225 to perform associated functions of displaying inputs of the keyboards and/or the cursors.

Each sound service block 23 comprises at least one sound effect port 231, a system audio service module 232, an audio render 233, and an audio interceptor 234. The sound effect port 231 is connected to at least one sound broadcasting device 231a and a sound input device 231b. The sound broadcasting device 231a is not limited to any specific configuration and type and a speaker is taken as an example in the present invention. The sound input device 231b is not limited to any specific configuration and type and a microphone is taken as an example in the present invention. Thus, the sound effect port 231 transmits a broadcast sound effect signal to the sound broadcasting device 231a to be broadcast thereby or the sound input device 231b transmits a sound input signal to the sound effect port 231.

The system audio service module 232 is connected to the sound effect port 231 to process sound effect output data or sound input data and transmit the sound effect output data to the sound effect port 231 to allow the sound effect port 231 to drive the sound broadcasting device 231a for broadcasting sound, or the system audio service module 232 may receive the sound input data that is supplied from the sound input device 231b to the sound effect port 231.

The audio renders 233 are respectively connected to the application program 220 of the computer 200 and the application program 320 of the computer 300 and the system audio service modules 232 to receive and process sharing sound broadcasting data transmitted through the USB interface receptacles 210, 310 and have them transmitted to the system audio service modules 232 to be processed for sound broadcasting by the system audio service modules 232.

The audio interceptors 234 are respectively connected to the application program 220 of the computer 200 and the application program 320 of the computer 300 and the system audio service modules 232 to intercept sound input data from the sound service blocks 23 or sound input data or sound output data from the systems of the computers 200, 300 so that the application programs 220, 320 may share the sound input data or the sound output data through the USB interface receptacles 210, 310 and the data bridge device 10 or allow the system audio service modules 232 to process for sound broadcasting.

The activation device 213 is not limited to any specific configuration and type and at least one hot key that is set on the keyboards 240, 340 is taken as an example in the first embodiment of the present invention. The activation device 213 is connected to the keyboard of the keyboard/mouse service block 22 so that pressing the activation device 213 causes an activation signal 213a that is transmitted by the keyboard/mouse service block 22.

The display service blocks 21, the keyboard/mouse service blocks 22, the sound service blocks 23 and/or the activation devices 213 of the switching control modules 20 can be of hardware implementation or alternatively be implemented in the form of software loaded in the computers 200, 300.

Figure 4:
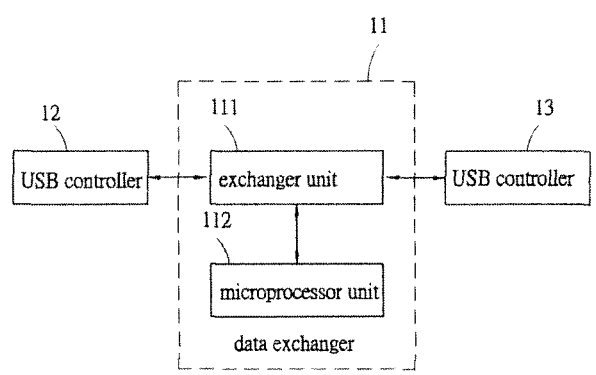
FIG. 4 is a circuit block diagram illustrating a media sharing device according to a second embodiment of the present invention.

Referring to FIG. 4, a media sharing device constructed in accordance with a second embodiment of the present invention, also designated with reference numeral 100, is shown, wherein the data exchanger 11 comprises an exchanger unit 111 and a microprocessor unit 112. The exchanger unit 111 has two terminals that are respectively connected to and between two USB controllers 12, 13 to carry out bi-directional data exchange between the two USB controllers 12, 13. The microprocessor unit 112 is connected to the exchanger unit 111 to take control of timing and route of data exchange by the exchanger unit 111.

Figure 5:
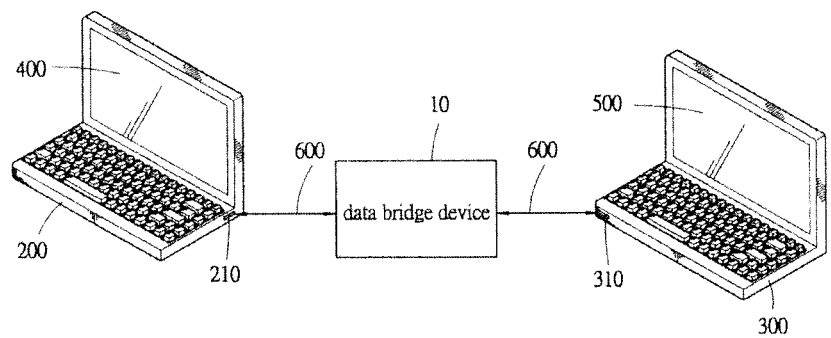
FIG. 5 is a schematic view demonstrating a preferred form of application of the media sharing device according to the present invention.
Figure 6:
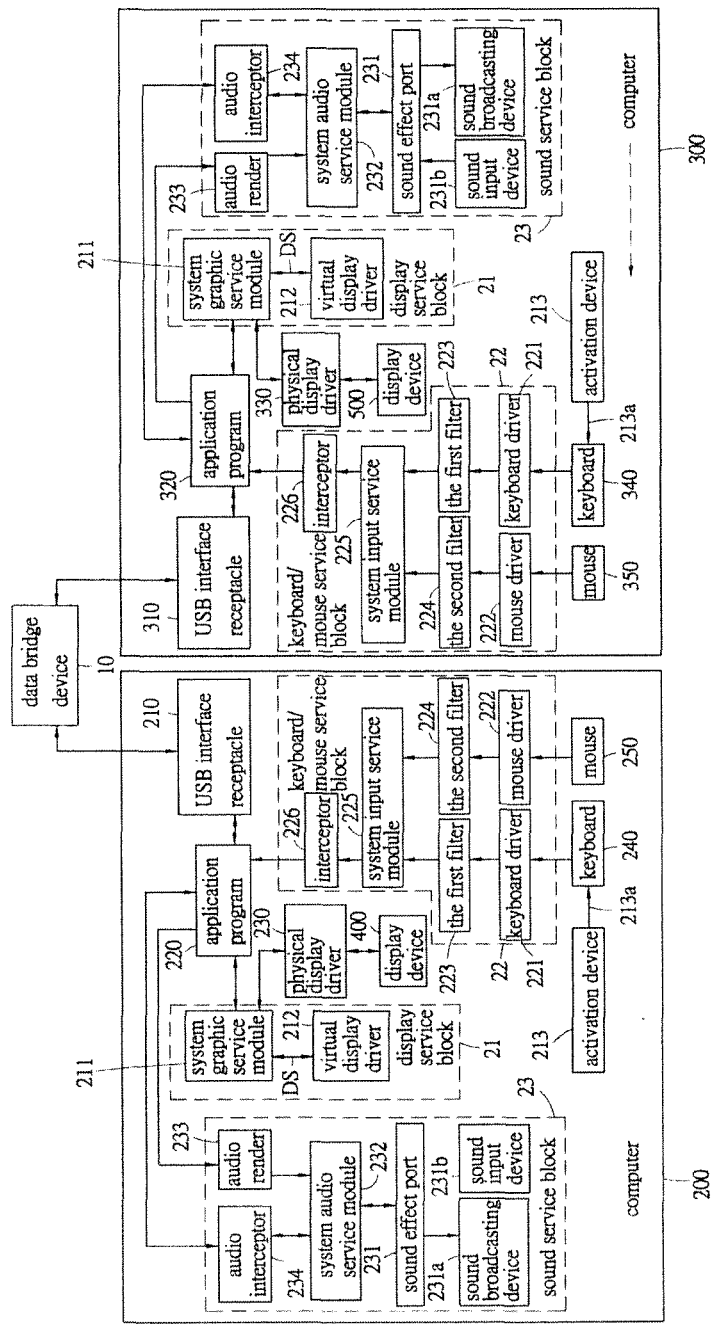
FIG. 6 is a block diagram demonstrating an operation that switches positions and functions of a controlling side computer and a controlled side computer that are illustrated in FIG. 5.

Referring to FIGS. 5 and 6, which demonstrate a preferred application of the media sharing device 100 according to the present invention, wherein both computers 200, 300 are notebook computers that are each provided with the switching control module 20, the USB interface receptacle 210 of the computer 200 and the USB interface receptacle 310 of the computer 300 are respectively connected by USB cables 600 to the USB controllers 12, 13 on the two terminals of the data bridge device 10. The connection between the data bridge device 10 and the USB cables 600 is not limited to what illustrated in FIG. 5, and may instead be implemented in a unitary device or means that combines the data bridge device 10 and the two USB cables 600 together.

In an initial condition where the computer 200 is a controlling side, while the computer 300 is a controlled side, the data bridge device 10 transmits the data of displayed image, keyboard, cursor, and sound of the computer 200, in USB format, to the switching control module 20 of the computer 300 to allow the display service block 21 of the switching control module 20 to process the displayed image data and the display device 500 of the computer 300 displaying the image transmitted from the computer 200. Further, the keyboard/mouse service block 22 of the switching control module 20 of the computer 300 process the input data of keyboard and cursor transmitted from the computer 200 to allow the keyboard data and cursor position to be shown on the displayed image so that the displayed image on the display device 500 of the computer 300 may show the operation statuses of the keyboard and cursor of the computer 200. Further, the sound service block 23 of the switching control module 20 of the computer 300 process the sound input data and sound output data transmitted from the computer 200 to allow the sound broadcasting device 231a of the computer 300 to broadcast the sound input or sound output effect supplied from the computer 200 as to achieve sharing of the media data, such as displayed image, keyboard, cursor, and sound, of the computer 200 by the computer 300.

To attempt to convert the computer 300 to the controlling side, the activation device 213 of the switching control module 20 of the computer 300 is activated (as indicated by phantom arrow shown in FIG. 6) to generate an the activation signal 213a to the application program 320, whereby the application program 320 carries out a controlling side function to take over the controlling side function that was previously carried out by the original controlling side of the computer 200. The activation signal 213a is transmitted through the data bridge device 10 to the application program 220 of the computer 200, in order to convert the computer 200 to the controlled side that was a position previously played by the computer 300 and to execute the controlled side function as previously performed by the computer 300. In a similar operation mode of the computer 300 sharing data of displayed image, keyboard, cursor, and sound, the computer 200, when turned into the controlled side, is allowed to share the media data of displayed image, keyboard, cursor, and sound transmitted from the computer 300.

For the sharing operation that share the displayed image, keyboard, cursor, and sound between the computers 200, 300, the data of the displayed image, keyboard, cursor or sound do not need to be the data of displayed image, keyboard, cursor, and sound that are being currently displayed or played or operated by or in the controlling side computer 200, 300 and may possibly be data of displayed image, keyboard, cursor, and sound that are otherwise designated by a user through the controlling side 200, 300 or the controlled side computer 300, 200 may alternatively be used as an extended displaying and broadcasting device for output and input of media or a sharing device.

The application of the media sharing device 100 according to the present invention is not limited to what is demonstrated in FIGS. 5 and 6 as a one-to-one connection arrangement between the computers 200, 300 and may be implemented in an arrangement of one-to-multiple connection.

Figure 7:
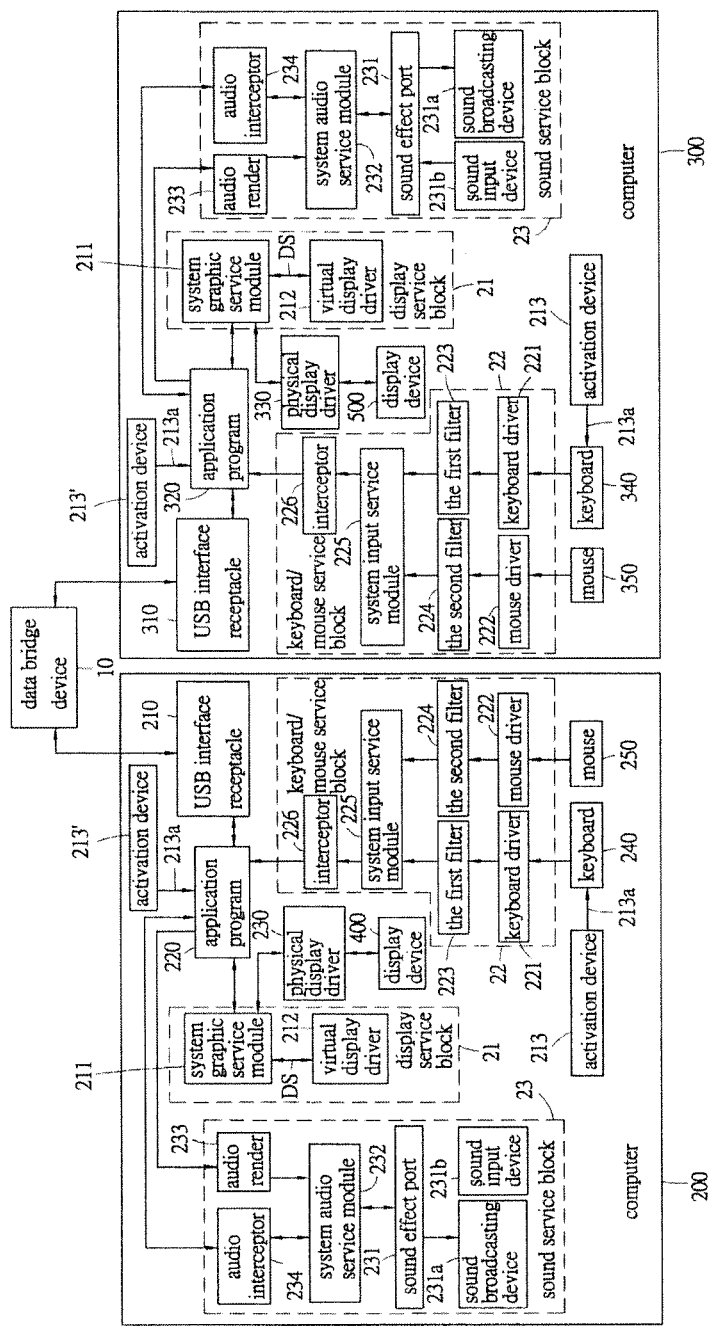
FIG. 7 is a circuit block diagram illustrating a media sharing device according to a third embodiment of the present invention.
Figure 8:
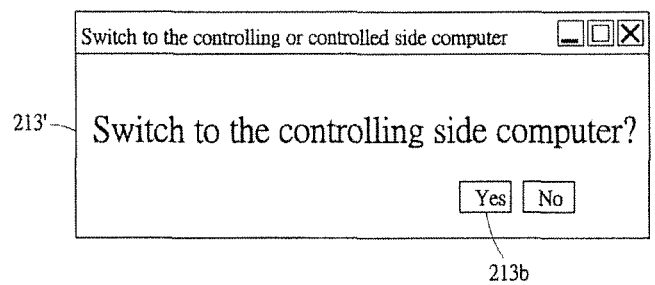
FIG. 8 is a schematic view illustrating a window dialog box that implements an activation device of FIG. 7.

Referring to FIGS. 7 and 8, a media sharing device according to a third embodiment of the present invention, also designated at 100, is shown, wherein the activation device 213' is made in the form of an application program of window-inserted dialog box. The activation device 213' is connected to the application program 220 of the computer 200 and the application program 320 of the computer 300, whereby through the contact and activation of a virtual pushbutton 213b of the activation device 213' (see FIG. 8), a controlling side control instruction in the form of an activation signal 213a is applied to the application program 220 of the computer 200 or the application program 320 of the computer 300, to switch the positions of the controlling side and the controlled side of the computers 200, 300n.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A media sharing device, comprising: at least one data bridge device, which has a function of converting media data of a displayed image, a keyboard, a cursor, and sound into a USB data format and comprises two terminals that are respectively connectable to a USB interface receptacle of a controlling side computer and a USB interface receptacle of a controlled side computer to allow the computers to carry out bi-directional transmission of the media data of the displayed image, the keyboard, the cursor, and the sound with the USB data format; and at least two switching control modules, which are respectively mounted in the controlling side computer and the controlled side computer that are connected to the two terminals of the data bridge device, each of the switching control modules comprising at least one activation device, whereby the media data of the displayed image, the keyboard, the cursor, and the sound supplied by the controlling side computer is transmitted by the data bridge device in the USB data format of the data of displayed image, keyboard, cursor, and sound to the controlled side computer, so that the controlled side computer is allowed to show the media data of the displayed image, the keyboard, the cursor, and the sound supplied from the controlling side computer, and the activation device of the controlled side computer is selectively operated to issue an activation signal, which is transmitted through the data bridge device to the controlling side computer to switch the controlling side computer and the controlled side computer, wherein the at least one data bridge device comprises at least one data exchanger, which has a function of converting the media data of the displayed image, the keyboard, the cursor, and the sound into the USB data format, and at least two USB controllers, which are respectively connectable to two terminals of the data exchanger, the USB controllers being respectively connected to the USB interface receptacle of the controlling side computer and the controlled side computer, wherein the at least one data exchanger comprises an exchanger unit, which has two terminals that are connected to and between the two USB controllers to carry out bi-directional data exchange between the two USB controllers, and a microprocessor unit, which is connected to the exchanger unit to control timing and route of data exchange of the exchanger unit, wherein the switching control module comprises at least one display service block, which receives the displayed image in the USB data format supplied from the USB controller of the data bridge device to process the displayed image of the USB data format, at least one keyboard/mouse service block, which receives keyboard and mouse input signals from the controlling side computer and the controlled side computer to display the keyboard and cursor, at least one sound service block, which receives sound input or output signals from the controlling side computer and the controlled side computer to carry out processing and broadcasting of the sound, and at least one activation device, which is connected to the keyboard/mouse service block, so as to allow the activation device to be activated to issue an activation signal that is transmitted through the keyboard/mouse service block, and wherein the display service block comprises at least one system graphic service module, which receives the displayed image of the USB data format from the USB controller of the data bridge device in order to process the displayed image of the USB data format to supply a displayed image signal to physical display drivers of the controlling side computer and the controlled side computer so that the physical display drivers apply the image displaying signal to the display devices to be displayed therein, and at least one virtual display driver, which is connected to the system graphic service module to receive the displayed image of the USB data format from the system graphic service module and convert the displayed image into the displayed image signal to be transmitted back to the system graphic service module.

2. The media sharing device as claimed in claim 1, wherein the keyboard/mouse service block comprises:
   at least one keyboard driver, which is connected to the keyboard of the controlling side computer and the controlled side computer to receive a keyboard input signal from the keyboard;
   at least one mouse driver, which is connected to a mouse of the controlling side computer and the controlled side computer to receive a mouse input signal from the mouse;
   at least one first filter, which is connected to the keyboard driver to carry out a filtering operation on the keyboard input signal;
   at least one second filter, which is connected to the mouse driver to carry out a filtering operation on the mouse input signal;
   at least one system input service module, which is connected to the first filter and the second filter to receive and process the filtered keyboard input signal and the filtered mouse input signal, the system input service module configured to supply keyboard and cursor data;
   and at least one interceptor, which is connected to the system input service module to intercept the keyboard and cursor data, the interceptor applying the keyboard and cursor data to the application programs of the controlling side computer and the controlled side computer, which carry out displaying of keyboard and cursor according to the data of the keyboard, the mouse, and the cursor.

3. The media sharing device as claimed in claim 1, wherein the sound service block comprises:
   at least one sound effect port, which is connected to at least one sound broadcasting device and a sound input device, so that the sound effect port transmitting a sound effect signal to the sound broadcasting device can be broadcast thereby or allowing the sound input device to transmit a sound input signal to the sound effect port;
   at least one system audio service module, which is connected to the sound effect port to process data of a sound input or a sound output and to transmit sound output data to the sound effect port to allow the sound effect port to drive the sound broadcasting device for broadcasting sound or allowing the system audio service module to receive sound input data that is supplied from the sound input device to the sound effect port;
   at least one audio render, which is connected to the application program of the controlling side computer and the controlled computer and the system audio service module to process sharing sound broadcasting data that is from the USB interface receptacle and that is transmitted to supply to the system audio service module to allow the system audio service module to carry out sound broadcasting processing; and
   at least one audio interceptor, which is connected to the application program of the controlling side computer and the controlled side computer and the system audio service module in order to intercept the sound input data from the sound service block or the computer and the sound input data or the sound output data of the system of the computer in order to allow the controlling side computer and the controlled side computer to carry out sharing and transmission of the sound input data or the sound output data through the USB interface receptacles and the data bridge device, or allowing the system audio service module to carry out processing for sound broadcasting.

4. The media sharing device as claimed in claim 1, wherein the activation device comprises a hot key.

5. The media sharing device as claimed in claim 1, wherein the activation device comprises an application program of inserted dialog box.

* * * * *